United States Patent
Bae et al.

(10) Patent No.: US 11,419,129 B2
(45) Date of Patent: Aug. 16, 2022

(54) METHOD FOR PERFORMING UPLINK TRANSMISSION THROUGH FREQUENCY HOPPING IN WIRELESS COMMUNICATION SYSTEM AND DEVICE THEREFOR

(71) Applicant: LG Electronics Inc., Seoul (KR)

(72) Inventors: Duckhyun Bae, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/962,736

(22) PCT Filed: Feb. 14, 2019

(86) PCT No.: PCT/KR2019/001831
§ 371 (c)(1),
(2) Date: Jul. 16, 2020

(87) PCT Pub. No.: WO2019/160359
PCT Pub. Date: Aug. 22, 2019

(65) Prior Publication Data
US 2020/0374896 A1    Nov. 26, 2020

Related U.S. Application Data

(60) Provisional application No. 62/630,322, filed on Feb. 14, 2018.

(51) Int. Cl.
*H04W 72/12*    (2009.01)
*H04W 72/04*    (2009.01)
(Continued)

(52) U.S. Cl.
CPC ............ *H04W 72/12* (2013.01); *H04B 1/713* (2013.01); *H04W 16/14* (2013.01); *H04W 72/04* (2013.01)

(58) Field of Classification Search
CPC ...... H04W 72/12; H04W 16/14; H04W 72/04
(Continued)

(56) References Cited

U.S. PATENT DOCUMENTS

2017/0366311 A1    12/2017  Iyer et al.
2018/0368169 A1*   12/2018  Jung ................ H04W 72/1289
2019/0313342 A1*   10/2019  Papasakellariou .... H04W 52/48

FOREIGN PATENT DOCUMENTS

KR    1020170081756    7/2017
WO        2018009043    1/2018
WO       WO2019102599    5/2019

OTHER PUBLICATIONS

KR Notice of Allowance in Korean Appln. No. 10-2020-7020248, dated Dec. 10, 2020, 5 pages (with English translation).
(Continued)

*Primary Examiner* — Angel T Brockman
(74) *Attorney, Agent, or Firm* — Fish & Richardson P.C.

(57) ABSTRACT

A method for a user equipment (UE) to perform an uplink transmission through a frequency hopping in a wireless communication system is disclosed. More specifically, the method includes receiving uplink (UL)-downlink (DL) configuration information from a base station; and performing the uplink transmission through the frequency hopping for each non-slot on non-slots that are repeated at least two times within one slot based on the UL-DL configuration information, wherein the non-slot is a scheduling unit with a smaller time interval than the one slot.

17 Claims, 10 Drawing Sheets

(51) Int. Cl.
*H04B 1/713* (2011.01)
*H04W 16/14* (2009.01)

(58) Field of Classification Search
USPC .......................................................... 370/329
See application file for complete search history.

(56) References Cited

OTHER PUBLICATIONS

Ericsson, On Frequency Hopping for Ultra-reliable Transmission, R1-1721020, 3GPP TSG-RAN WG1 Meeting #91, Reno, NV, U.S.A., Nov. 27-Dec. 1, 2017, 3 pages.
Huawei, HiSilicon, Intra-slot hopping pattern for long PUCCH over multiple slots, R1-1800033, 3GPP TSG RAN WG1 Ad Hoc Meeting, Vancouver, Canada, Jan. 22-26, 2018, 5 pages.
NEC, Frequency hopping schemes for NR UL PUSCH, R1-1720900, 3GPP TSG RAN WG1 Meeting #91, Reno, Nevada, US, Nov. 27-Dec. 1, 2017, 5 pages.
PCT International Search Report in International Appln. No. PCT/KR2019/001831, dated Feb. 14, 2019, 6 pages (with English translation).
Intel Corporation, "UL data transmission procedures in NR," R1-1717396, 3GPP TSG RAN WG1 Meeting 90bis, Prague, Czech Republic, Oct. 9-13, 2017, 12 pages.
Korean Office Action in Korean Appln. No. 10-2020-7020248, dated Aug. 25, 2020, 14 pages (with English translation).
NTT Docomo, Inc., "Offline summary for AI 7.3.3.4 UL data transmission procedure," R1-1721454, 3GPP TSG RAN WG1 Meeting #91, Reno, USA, Nov. 27-Dec. 1, 2017, 41 pages.
Intel Corporation, "Remaining details of UL data transmission procedures in NR," R1-1720097, Presented at 3GPP TSG RAN WG1 Meeting 91, Reno, USA, Nov. 27-Dec. 1, 2017, 10 pages.
NTT Docomo, Inc., "DL/UL resource allocation," R1-1720821, Presented at 3GPP TSG RAN WG1 Meeting 91, Reno, USA, Nov. 27-Dec. 1, 2017, 12 pages.
NTT Docomo, Inc., "Offline summary for AI 7.3.3.4 UL data transmission procedure," R1-1801080, Presented at 3GPP TSG RAN WG1 NR Ad Hoc Meeting, Vancouver, Canada, Jan. 22-26, 2018, 33 pages.
NTT Docomo, Inc., "UL data transmission without UL grant," R1-1716107, Presented at 3GPP TSG RAN WG1 Meeting NR Ad-Hoc#3, Nagoya, Japan, Sep. 18-21, 2017, 10 pages.
Office Action in Japanese Appln. No. 2020-543163, dated Oct. 19, 2021, 10 pages (with English translation).

* cited by examiner

METHOD FOR PERFORMING UPLINK TRANSMISSION THROUGH FREQUENCY HOPPING IN WIRELESS COMMUNICATION SYSTEM AND DEVICE THEREFOR

CROSS-REFERENCE TO RELATED APPLICATIONS

This application is a National Stage filing under 35 U.S.C. 371 of International Application No. PCT/KR2019/001831, filed on Feb. 14, 2019, which claims the benefit of U.S. Provisional Application No. 62/630,322, filed on Feb. 14, 2018, the contents of which are all hereby incorporated by reference herein in their entirety.

TECHNICAL FIELD

The present disclosure relates to a wireless communication system, and more particularly to a method for performing an uplink transmission through a frequency hopping and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides an efficient frequency hopping method according to resources allocated when a UE performs uplink transmission using time/frequency resources of various time lengths.

More specifically, the present disclosure provides a method of applying a frequency hopping for non-slot based scheduling used in URLLC, etc.

The present disclosure also provides a method of delaying or not applying a frequency hopping for a specific non-slot when the specific non-slot is not available in a frequency hopping repeated for each non-slot.

The technical objects of the present disclosure are not limited to the aforementioned technical objects, and other technical objects, which are not mentioned above, will be apparently appreciated by a person having ordinary skill in the art from the following description.

Technical Solution

The present disclosure provides a method for a user equipment (UE) to perform an uplink transmission through a frequency hopping in a wireless communication system.

More specifically, the method comprises receiving uplink (UL)-downlink (DL) configuration information from a base station; and performing the uplink transmission through the frequency hopping for each non-slot on non-slots that are repeated at least two times within one slot based on the UL-DL configuration information, wherein the non-slot is a scheduling unit with a smaller time interval than the one slot.

When a specific non-slot among the non-slots that are repeated at least two times based on the UL-DL configuration information is not available, a frequency hopping related to the specific non-slot is applied to a next repeated non-slot.

A scheduling unit of the non-slot is configured based on at least one of a subcarrier spacing or a number of symbols included in the scheduling unit.

The non-slot is used for ultra reliable and low latency communication (URLLC), an unlicensed band or a millimeter wave.

When a resource for the uplink transmission is not included in a bandwidth part (BWP) by the frequency hopping related to the non-slot, the resource that is not included in the BWP is moved by a predetermined resource block (RB) offset or is not used for the uplink transmission.

A movement by the predetermined RB offset for the resource that is not included in the BWP is determined depending on a type of waveform configured for the uplink transmission.

The waveform is cyclic prefix (CP)-orthogonal frequency division multiplexing (OFDM) or discrete Fourier transform spread OFDM (DFT-s-OFDM).

When the waveform is the CP-OFDM, the resource that is not included in the BWP is moved by the predetermined RB offset.

The present disclosure provides a user equipment (UE) performing an uplink transmission through a frequency hopping in a wireless communication system, the UE comprising a transmitter configured to transmit a radio signal; a receiver configured to receive the radio signal; and a processor functionally connected to the transmitter and the receiver, wherein the processor is configured to receive uplink (UL)-downlink (DL) configuration information from a base station; and perform the uplink transmission through the frequency hopping for each non-slot on non-slots that are repeated at least two times within one slot based on the UL-DL configuration information, wherein the non-slot is a scheduling unit with a smaller time interval than the one slot.

When a specific non-slot among the non-slots that are repeated at least two times based on the UL-DL configuration information is not available, the processor is configured to apply a frequency hopping related to the specific non-slot to a next repeated non-slot.

When a resource for the uplink transmission is not included in a bandwidth part (BWP) by the frequency hopping related to the non-slot, the processor is configured to move the resource, that is not included in the BWP, by a predetermined resource block (RB) offset or not use the resource for the uplink transmission.

When the waveform is the CP-OFDM, the processor is configured to move the resource, that is not included in the BWP, by the predetermined RB offset.

Advantageous Effects

The present disclosure can apply the frequency hopping without reducing resource utilization even if UEs are allocated radio resources of various time lengths in a next-generation wireless system.

The present disclosure can apply the frequency hopping more smoothly in a situation where a frequency hopping offset is only limitedly applicable.

The present disclosure can prevent a UE from performing an operation different from an intention of a base station when the UE performs the frequency hopping in a process of performing a random access.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, which are included as part of the detailed description in order to provide a thorough understanding of the present disclosure, provide embodiments of the present disclosure and together with the description, describe the technical features of the present disclosure.

MODE FOR INVENTION

Figure 1:
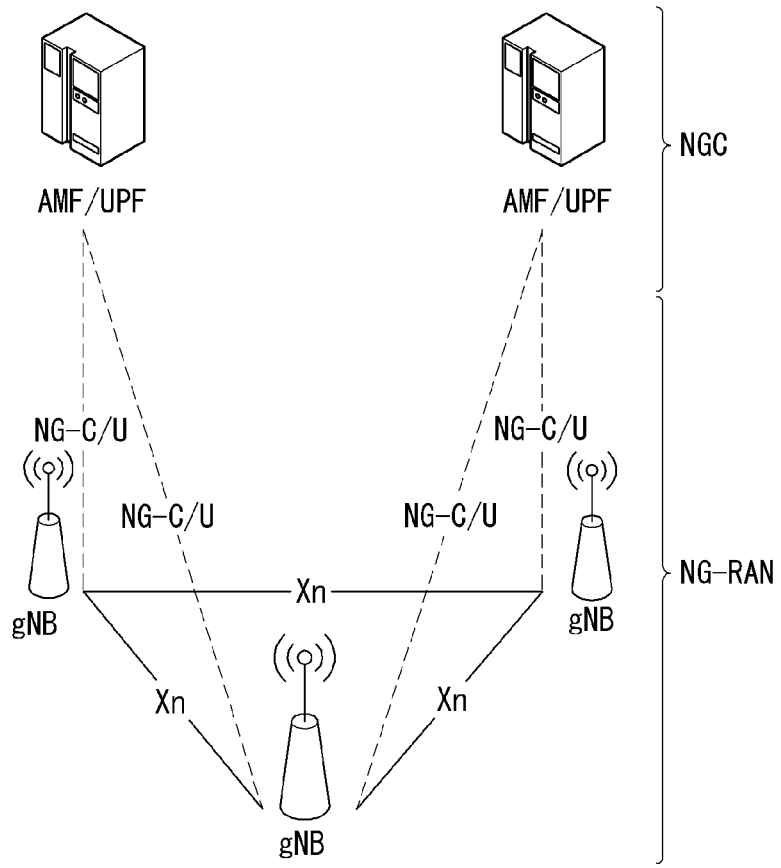
FIG. 1 is a diagram illustrating an example of an overall system structure of NR to which a method proposed in the present disclosure may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP), gNB (general NB, generation NB). Furthermore, the terminal may be fixed or may have mobility and may be substituted with another term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR(New RAT) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, the next generation wireless access technology is an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is being discussed. Further, a design of a communication system (e.g., Ultra-Reliable and Low Latency Communication (URLLC)) considering a service and/or a user equipment sensitive to reliability and/or latency of communication is also being discussed.

Hereinafter, in this specification, for easy description, the next-generation radio access technology is referred to as a new radio access technology (RAT) and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | Δf = 2μ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
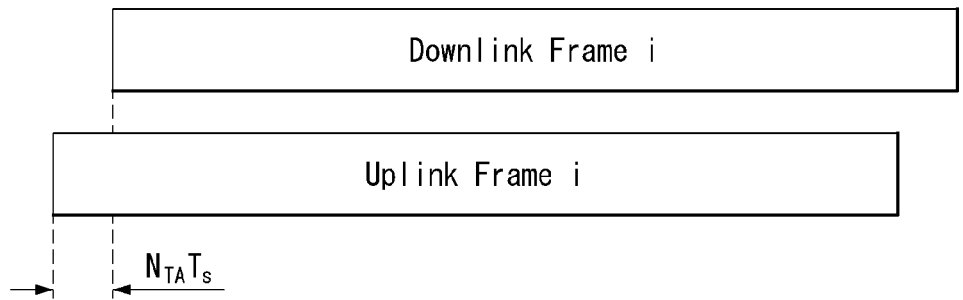
FIG. 2 illustrates a relationship between an uplink frame and a downlink frame in a wireless communication system to which a method proposed in the present disclosure may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols for each slot ($N_{symb}^{slot}$) the number of slots for each radio frame ($N_{slot}^{frame,\mu}$), and the number of slots for each subframes ($N_{slot}^{subframe,\mu}$) in a normal CP and Table 3 shows the number of OFDM symbols for each slot, the number of slots for each radio frame, and the number of slots for each subframe in an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
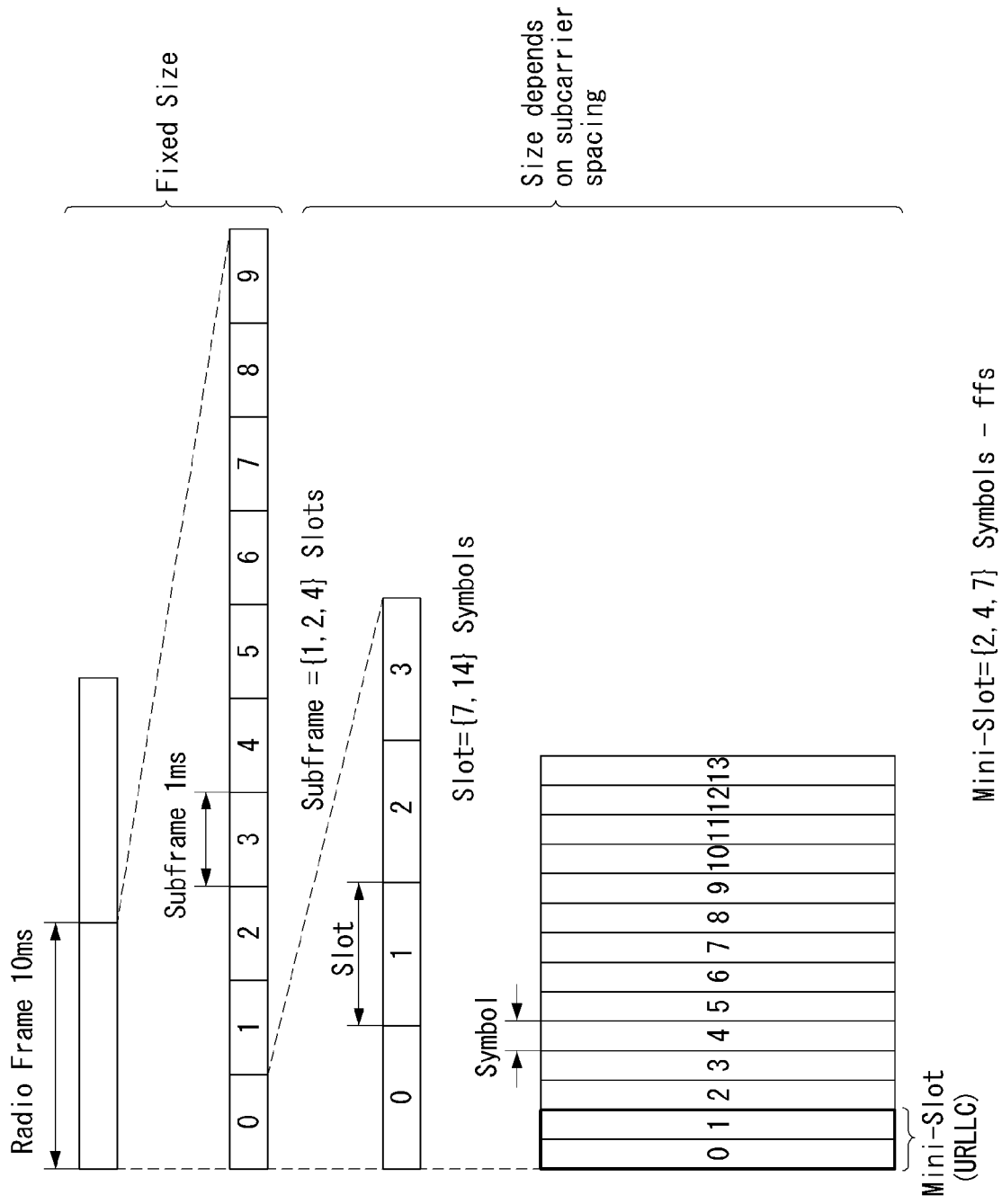
FIG. 3 illustrates an example of a frame structure in an NR system.

FIG. 3 illustrates an example of a frame structure in an NR system. FIG. 3 is just for convenience of the description and does not limit the scope of the present disclosure.

In the case of Table 3, as an example of a case where μ=2, i.e., a case where a subcarrier spacing (SCS) is 60 kHz, one subframe (or frame) may include four slots by referring to Table 2 and as an example, a case of one subframe={1,2,4} slots is illustrated in FIG. 3 and the number of slot(s) which may be included in one subframe may be defined as shown in Table 2.

Further, a mini-slot may be constituted by 2, 4, or 7 symbols and constituted by more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 4:
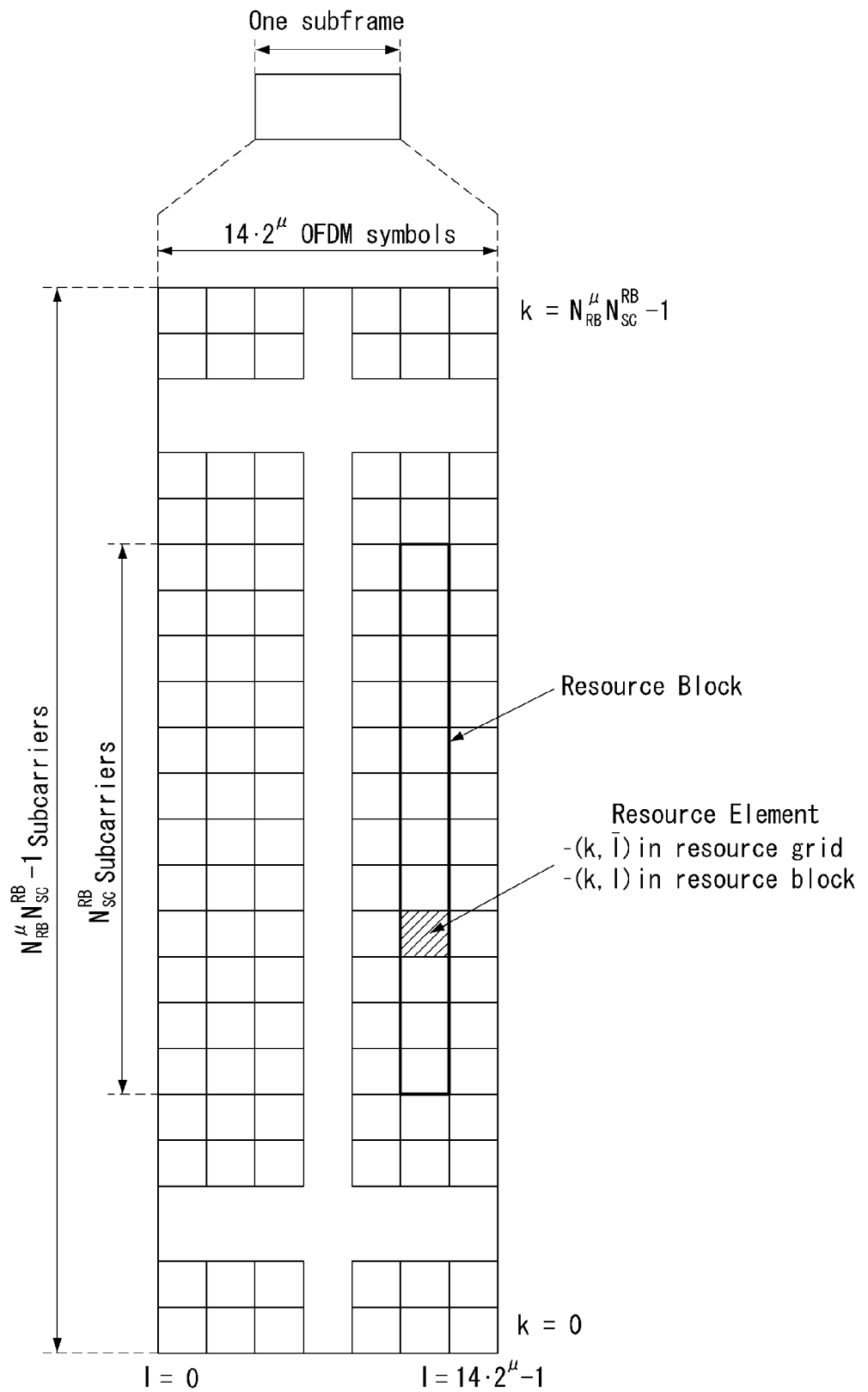
FIG. 4 illustrates an example of a resource grid supported by a wireless communication system to which a method proposed in the present disclosure may be applied.

FIG. 4 illustrates an example of a resource grid supported by a wireless communication system to which a method proposed in the present disclosure may be applied.

Referring to FIG. 4, it is exemplarily described that the resource grid is constituted by $N_{RB}^{\mu}N_{sc}^{RB}$ subcarriers on the frequency domain and one subframe is constituted by 14·2μ OFDM symbols, but are not limited thereto.

In the NR system, a transmitted signal is described by one or more resource grids constituted by $N_{RB}^{\mu}N_{sc}^{RB}$ subcarriers and $2^{\mu}N_{symb}^{(\mu)}$ OFDM symbols. Here, $N_{RB}^{\mu} \leq N_{RB}^{max,\mu}$. The $N_{RB}^{max,\mu}$ represents a maximum transmission bandwidth and this may vary even between uplink and downlink in addition to numerologies.

Figure 5:
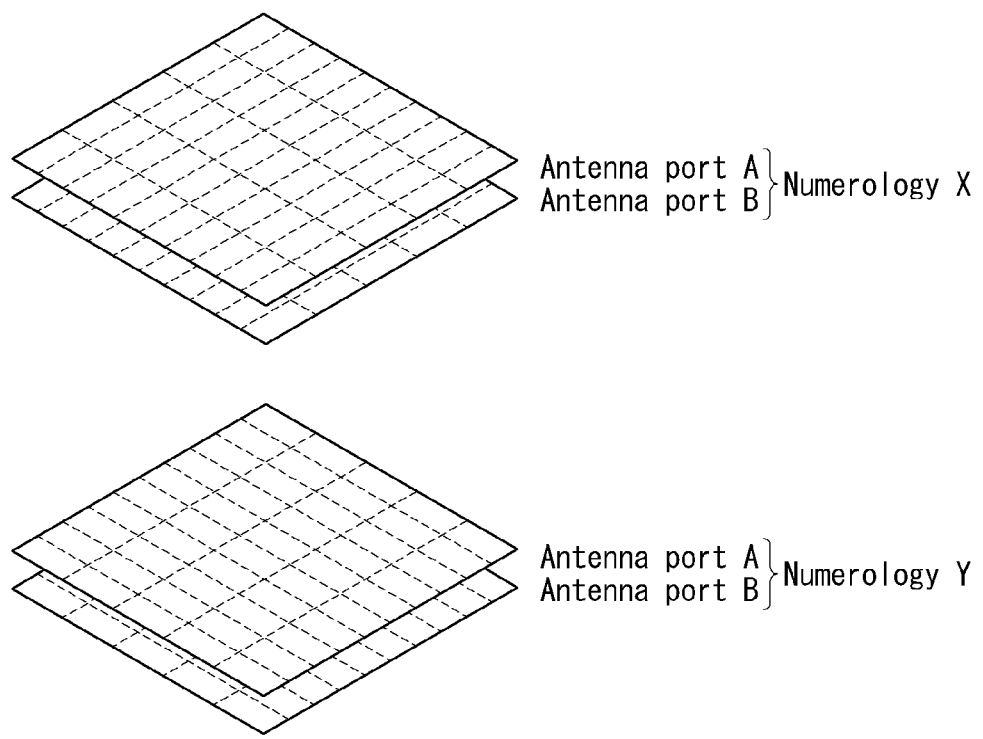
FIG. 5 illustrates examples of a resource grid for each antenna port and numerology to which a method proposed in the present disclosure may be applied.

In this case, as illustrated in FIG. 5, one resource grid may be configured for each numerology μ and each antenna port p.

FIG. 5 illustrates examples of a resource grid for each antenna port and numerology to which a method proposed in the present disclosure may be applied.

Each element of the resource grid for the numerology μ and the antenna port p is referred to as a resource element and uniquely identified by an index pair (k,l). Here, k=0, . . . , $N_{RB}^{\mu}N_{sc}^{RB}-1$ represents an index on the frequency domain and l=0, . . . , $2^{\mu}N_{symb}^{(\mu)}-1$ represents a position of the symbol in the subframe. The index pair (k,l) is used when representing the resource element in the slot. Here l=0, . . . , $N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is not specified, the indexes p and μ may be dropped, and as a result, the complex value may become $a_{k,l}^{(p)}$ or $a_{k,l}$.

Further, a physical resource block is defined by $N_{sc}^{RB}=12$ consecutive subcarriers on the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upward from 0 in the frequency domain for subcarrier interval setting μ.

The center of subcarrier 0 of common resource block 0 for the subcarrier interval setting μ coincides with 'point A'. A common resource block number $n_{CRB}^{\mu}$ and the resource element (k,l) for the subcarrier interval setting μ in the frequency domain may be given as in Equation 1 below.

$$n_{CRB}^{\mu} = \left\lfloor \frac{k}{N_{sc}^{RB}} \right\rfloor \qquad [\text{Equation 1}]$$

Here, k may be defined relatively to point A so as to correspond to a subcarrier in which k=⁰ is centered on point A. The physical resource blocks are numbered from 0 to $N_{BWP,i}^{size}-1$ in a bandwidth part (BWP) and i represents the number of BWP. A relationship between the physical resource block $n_{PRB}$ and the common resource block $n_{CRB}$ in BWP i may be given by Equation 2 below.

$$n_{CRB} = n_{PRB} + N_{BWP,i}^{start} \qquad [\text{Equation 2}]$$

Here, $n_{BWP,i}^{start}$ may be a common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

Figure 6:
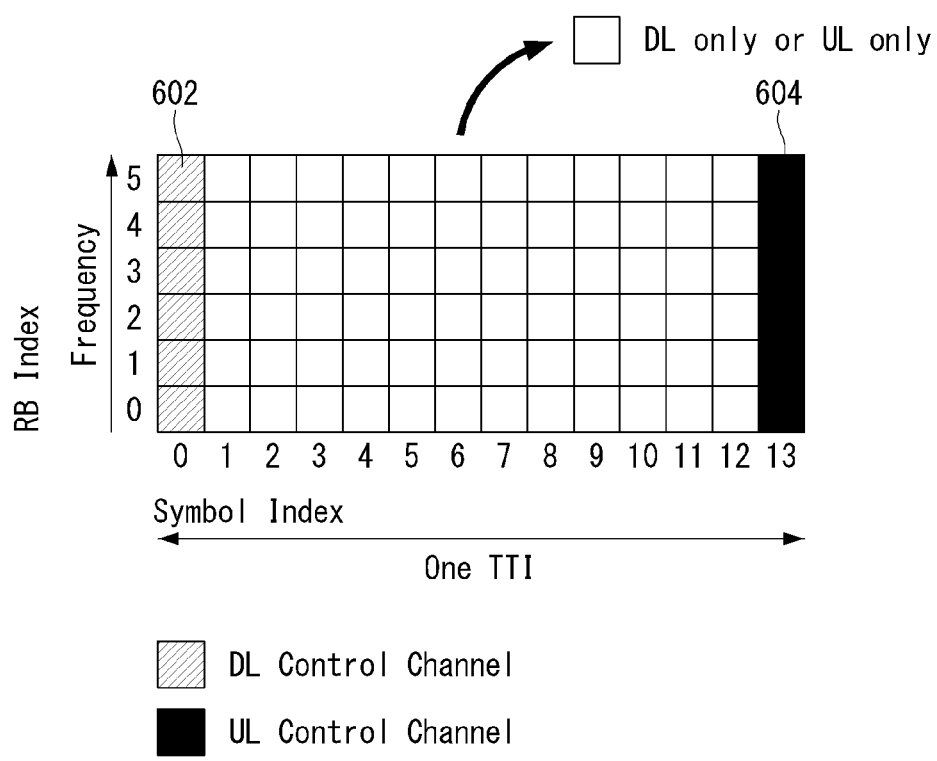
FIG. 6 illustrates one example of a self-contained structure to which a method proposed in the present disclosure may be applied.

FIG. 6 illustrates one example of a self-contained structure to which a method proposed in the present disclosure may be applied. FIG. 5 is just for convenience of the description and does not limit the scope of the present disclosure.

Referring to FIG. 6, it is assumed that one transmission unit (e.g., slot or subframe) consists of 14 orthogonal frequency division multiplexing (OFDM) symbols as in legacy LTE.

In FIG. 6, a region 602 denotes a downlink control region, and a region 604 denotes an uplink control region. Further, regions (i.e., regions without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data can be reduced. Therefore, latency related to data transfer can be minimized.

In the self-contained slot structure illustrated in FIG. 6, a time gap for a process of switching from a transmission mode to a reception mode of a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, as an intermediate form of digital beamforming and analog beamforming, may be considered. In this case, although there is a difference depending on a connection method of B TXRUs and Q antenna elements, the number of directions of the beams that may be transmitted at the same time is limited to B or less.

Information Related to Frequency Hopping

In new RAT, a UE can use various transmission durations.

A base station may schedule the UE so that the UE uses symbols within a slot using various methods.

It may be considered that a frequency hopping is applied to scheduled resource, particularly, uplink scheduled resource.

If each UE has a different hopping boundary, it may be difficult to perform the scheduling so that multiple UEs efficiently use resources.

In order to such a problem, the following methods (Methods 1 and 2) may be used.

(Method 1)

Method 1 may be a method in which a hopping boundary is determined as a location based on a slot when a location of a reference signal such as a demodulation reference signal (DMRS) of uplink resource used is determined based on a slot.

For example, in the new RAT, if the UE uses PUSCH mapping type A, a PUSCH may be frequency-hopped always at an eighth symbol.

(Method 2)

Method 2 may be a method in which a hopping boundary is determined as a location based on a slot regardless of a location of a reference signal such as a DMRS of uplink resource used.

For example, in the new RAT, the UE may frequency-hop and transmit the PUSCH always at an eighth symbol regardless of a PUSCH mapping type.

From the above description, a frequency hopping boundary of the PUSCH is determined without any RRC parameter like the PUCCH.

In case of PUCCH frequency hopping, a hopping boundary is specified by its time resource allocation.

However, it is not preferred to use the same mechanism as the PUCCH for the PUSCH frequency hopping.

If the hopping boundary of the PUSCH can be different according to its time resource allocation, it is difficult to efficiently allocate multiple PUSCHs with frequency hopping to a resource grid.

Since a PUSCH has a larger portion in the uplink resource than the PUCCH, it would be more critical issue than the PUCCH case. Therefore, it may be preferred to determine the hopping boundary based on a slot boundary for the PUSCH.

Considering that a position of a PUSCH DMRS is determined by a slot boundary for the PUSCH mapping type A, a frequency hopping boundary can be determined by a relative position to a start of the slot at least for the PUSCH mapping type A.

At least for the PUSCH mapping type A, the PUSCH hopping boundary is determined by a relative position to a start of the slot.

UE PUSCH Frequency Hopping Procedure

In case of resource allocation type 1, regardless of whether or not a transform precoding is enabled for PUSCH transmission, a UE may perform a PUSCH frequency hopping, otherwise no PUSCH frequency hopping is performed.

When the transform precoding and the frequency hopping are enabled for the PUSCH, RE mapping is performed in the following order:

The modulated symbols are first mapped across subcarriers, then across transform precoded symbols within a frequency hopping, then across frequency hops occupying different sets of PRBs.

If the UE is configured by higher layer parameter frequency-hopping-PUSCH, one of two frequency hopping modes can be configured:

Intra-slot frequency hopping, applicable to single slot and multi-slot PUSCH transmission.

Inter-slot frequency hopping, applicable to multi-slot PUSCH transmission.

The frequency hopping on PUSCH is enabled, and for the resource allocation type 1, frequency offsets are configured by higher layer parameter frequency-hopping-offset-set:

when the size of the active BWP is less than 50 PRBs, one of two higher layer configured offsets is indicated in the UL grant.

when the size of the active BWP is greater than 50 PRBs, one of four higher layer configured offsets is indicated in the UL grant.

A starting RB during in each hop is defined by the following Equation 3.

$$RB_{start} = \begin{cases} RB_{start} & \text{First hop} \\ (RB_{start} + RB_{offset}) \bmod N_{BWP}^{size} & \text{Second hop} \end{cases} \quad [\text{Equation 3}]$$

where $RB_{start}$ is a starting resource within the UL BWP, as calculated from resource block assignment information of the resource allocation type 1, and $RB_{offset}$ is a frequency offset in RBs between two frequency hops.

In case of inter-slot frequency hopping, the frequency hopping happens at each slot. The starting RB during slot $n_s^\mu$ is given by the following Equation 4.

$$RB_{start}(n_s^\mu) = \begin{cases} RB_{start} & n_s^\mu \bmod 2 = 0 \\ (RB_{start} + RB_{offset}) \bmod N_{BWP}^{size} & (n_s^\mu \bmod 2 = 1) \end{cases} \quad [\text{Equation 4}]$$

Where $n_{s,0}^\mu$ is a slot number within a radio frame of a first PUSCH slot of a multi-slot PUSCH transmission, and $n_s^\mu$ is a current slot number within a radio frame.

Further, the multi-slot PUSCH transmission can take place, $RB_{start}$ is a starting resource within the UL BWP, as calculated from the resource block assignment information of the resource allocation type 1, and $RB_{offset}$ is a frequency offset in RBs between two frequency hops.

The next-generation wireless system such as the 5G system can allow a base station to allocate time/frequency resources to a UE more flexibly than the existing wireless system, does not limit a frequency domain of the UE to a system bandwidth, and can allocate an individual bandwidth part (BWP) to the UE.

In such a situation, when the UEs perform uplink transmission using a frequency hopping to obtain frequency diversity, additional consideration for various scheduling units is needed to perform the frequency hopping while maintaining the resource utilization.

In the present disclosure, the frequency hop may be interpreted as the same meaning as the frequency hopping.

Hereinafter, the present disclosure provides a frequency hopping method in which in the next-generation wireless system, the UEs are allocated uplink resources in various scheduling units, and the UEs can efficiently TDM (time division multiplexing)/FDM (frequency division multiplexing) use the resources when some UEs use the uplink resources through the aggregation/repetition.

The present disclosure proposes a solution to a bandwidth part (BWP) and a problem portion in the frequency hopping of the UE.

The present disclosure mainly handles the frequency hopping method for the PUSCH transmission of the UE, but may be applied to PUSCH transmission using a configured grant in addition to dynamic grant PUSCH transmission generally used by the UE, PUCCH transmission by semi-static/dynamic signaling, or overall uplink transmission, that the UE uses in the wireless communication system, such as uplink transmission upon random access.

In the next-generation wireless communication system, a reference time unit used to transmit/receive the physical channel may be diversified according to an application field or a type of traffic.

The reference time may be a basic unit that schedules a specific physical channel, and the reference time unit may vary depending on the number of symbols constituting the scheduling unit and/or a subcarrier spacing.

For convenience of explanation, the reference time unit is described below based on a slot and a non-slot.

For example, the slot may be a basic scheduling unit used in a general data traffic (e.g., enhanced mobile broadband (eMBB)).

The non-slot may have a smaller time interval less than the slot in the time domain. The non-slot may be a basic scheduling unit used in a traffic or communication scheme (e.g., ultra reliable and low latency communication (URLLC) or unlicensed band or millimeter wave) for a more special purpose.

However, this is merely an example, and it is obvious that extension can be made from the technical spirit of the present disclosure even when the eMBB transmits/receives the physical channel based on the non-slot or the URLLC or another communication technique transmits/receives the physical channel based on the slot.

1. Frequency Hopping for Non-Slot

A frequency hopping method for non-slot is first described.

As described above, in new RAT (NR), a UE can use various transmission durations.

A base station may schedule the UE so that the UE uses symbols within a slot using various methods.

When a frequency hopping is applied to scheduled resource, particularly, uplink scheduled resource, the following methods may be considered under what conditions and where the frequency hopping is performed.

(Method 1-1)

Method 1-1 relates a method of applying a frequency hopping to a scheduled resource only in a transmission duration equal to or greater than X symbols.

The X may be a predetermined value or a value that the base station informs via higher layer signalling or L1 signalling.

In case of scheduled resource with a small length, a RS overhead that is generated by a DMRS required for channel estimation of each hopping may affect a performance more greatly than the frequency diversity capable of being obtained through the frequency hopping.

Since the DMRS is uniformly transmitted on all symbols, an influence may vary depending on the transmission duration of all the scheduled resources even if one DMRS symbol is equally necessary.

Thus, only when the frequency hopping is effective without a separate signalling overhead, the frequency hopping can be applied by using the method 1-1.

(Method 1-2)

Method 1-2 relates to hopping an entire transmission duration when one symbol among a starting symbol, an ending symbol or a transmission duration of the scheduling is present subsequently based on N-th symbol.

The N may be a predetermined value or a value that the base station informs via higher layer signalling or L1 signalling.

(Method 1-3)

Method 1-3 may be a method of applying a frequency hopping based on a symbol used as a DMRS.

As an example, only when a UE using a transmission duration of X symbols uses two or more symbols of the X symbols, the UE may perform the frequency hopping.

In this instance, if a symbol to be used as the DMRS is K1-th symbol and K2-th symbol (K1>K2), the frequency hopping may be performed on the K2-th symbol.

If the symbols used as the DMRS are more than two, the frequency hopping may be performed on a DMRS symbol closest to X/2.

2. Frequency Hopping for Non-Slot Aggregation/Repetition

The next-generation wireless communication system considers a method for a UE to repeatedly transmit the same transfer block by a given amount for reliability or service coverage.

In this instance, the repetitive transmission may be differently configured depending on a resource acquisition method or a resource allocation size, etc.

More specifically, when non-slot scheduling and slot scheduling are divided by any criteria or any conditions, a method for the UE to aggregate/repeat the scheduled resources may change.

When the aggregation/repetition method of scheduled resources changes as described above, non-slot based scheduled resource received by the UE may be repeatedly transmitted within one slot. When the UE successively transmits multiple non-slots, the following methods may be considered to apply the frequency hopping.

(Method 2-1)

Method 2-1 relates to a method of individually applying a frequency hopping by regarding respective repeated non-slot scheduling as one non-slot scheduling.

In this instance, the frequency hopping method for the non-slot mentioned above can be applied to each non-slot scheduling.

(Method 2-2)

Method 2-2 relates to a method of sequentially applying a frequency hopping to each non-slot scheduling similarly to a frequency hopping between slots.

For example, when non-slot scheduling is repeated K times, the frequency hopping is not applied to odd-numbered non-slot scheduling, and the frequency hopping may be applied only to even-numbered non-slot scheduling.

As above, when the frequency hopping is applied to the repeated non-slot scheduling, it may be impossible to use some repeated non-slot scheduling.

For example, the transmission is impossible by other transmission with higher priority, or the corresponding scheduled resource is determined as a transmission direction such as DL by the semi-static/dynamic TDD operation, etc., and thus the corresponding resource cannot be used. In this instance, the following methods 2-3 and 2-4 may be considered.

(Method 2-3)

Method 2-3 relates to a method of performing a frequency hopping depending on the order of transmission parameters or a repetition count as in Option 1 of FIG. 7(a).

Referring to FIG. 7(a), when non-slot scheduling is repeatedly transmitted four times, and a resource for 3rd non-slot scheduling corresponds to a canceled symbol 701, this method does not delay transmission for the third non-slot scheduling 702 and does not perform the corresponding transmission.

Thus, it can be seen that transmission for 4th non-slot scheduling 704 is performed in order in a symbol 703 corresponding to Index 4 of FIG. 7(a).

(Method 2-4)

Method 2-4 relates to a method of performing a frequency hopping when all transmission occasions are valid as in Option 2 of FIG. 7(b). In other words, frequency hopping can be sequentially applied only to the transmission occasion under the assumption that the transmission occasion exists only in valid symbols except a cancelled symbol.

Referring to FIG. 7(b), because valid symbols are three (symbol corresponding to Index 1, symbol corresponding to Index 2, and symbol corresponding to Index 4), non-slot scheduling is repeatedly transmitted three times. Because a resource for $3^{rd}$ non-slot scheduling corresponds to a canceled symbol 710, it can be seen that transmission for the $3^{rd}$ non-slot scheduling 720 occurs in the symbol 730 corresponding to Index 4.

Figure 7:
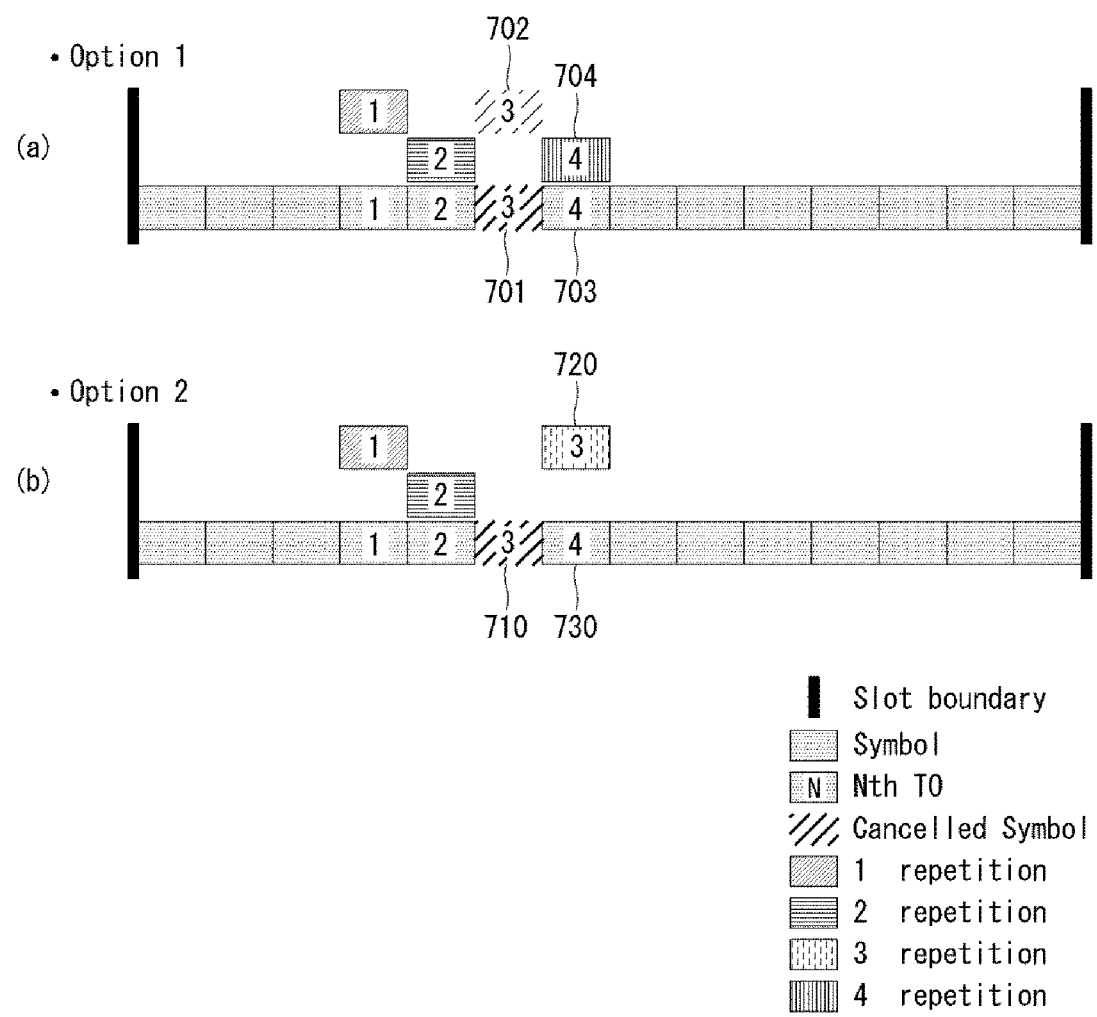
FIG. 7 illustrates an example of a frequency hopping method of uplink transmission through non-slot scheduling described in the present disclosure.

FIG. 7 illustrates an example of a frequency hopping method of uplink transmission through non-slot scheduling described in the present disclosure.

As illustrated in FIG. 7, cancelled resources 701 and 710 may be differently configured or generated for each UE.

Accordingly, the base station can allow the frequency hopping to be performed without considering the resource invalid, in order to efficiently allocate time/frequency resources to different UEs.

The above-described methods may be differently applied depending on the reason why the time/frequency resources allocated by the base station are invalid.

For example, if an invalid resource according to cell-specific UL/DL configuration occurs, the above-described method 2-3 may be applied, otherwise the method 2-4 may be applied.

3. Handling of Frequency Hopping Offset Exceeding BWP Range

The next-generation wireless communication system specifies one element among a set of frequency hopping offsets configured with semi-static signaling and a set of frequency hopping offsets together with uplink resource allocation via dynamic signaling, for the purpose of uplink frequency hopping.

Since the set of frequency hopping offsets is transferred via the semi-static signalling as described above, this may not always use a proper value considering the resource, the BWP length, and the scheduling of other UE.

Figure 8:
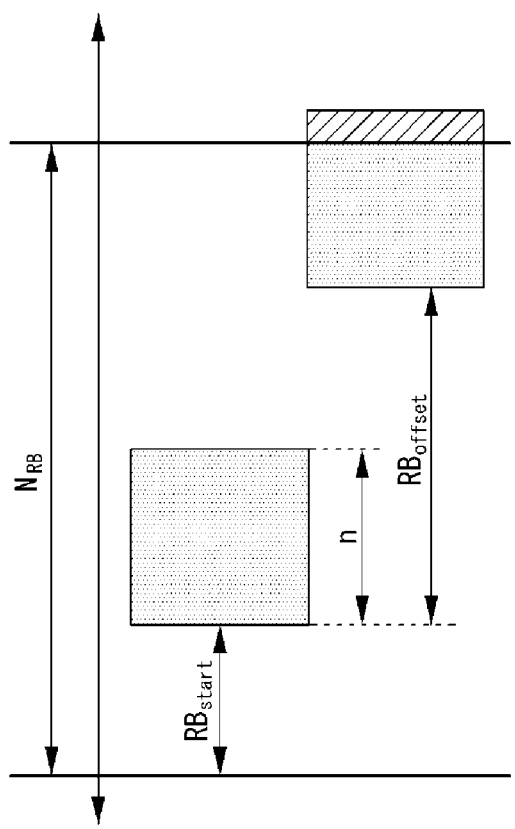
FIG. 8 illustrates an example of an uplink transmission method for a frequency hopping with semi-static offset described in the present disclosure.

An improper value, particularly, as illustrated in FIG. 8, when n resource blocks in RB_start-th resource block are allocated to the UE, RB_offset is used as a frequency hopping offset, and the number of resource blocks in BWP is N_RB, when N_RB<RB_start+n+RB_offset<N_RB+n, the following methods may be considered.

FIG. 8 illustrates an example of an uplink transmission method for a frequency hopping with semi-static offset described in the present disclosure.

(Method 3-1)

When a frequency hopped resource exceeds a BWP range, the UE may ignore the allocation of the corresponding resource (exceeding the BWP range by frequency hopping).

Alternatively, in this case, the UE does not use the frequency hopping and may perform UL transmission.

(Method 3-2)

When frequency hopped resources exceed a BWP range, it is assumed that RB indexes of the resources exceeding the BWP range are assumed to be $[r_1, r_2, \ldots, r_n]$.

Figure 9:
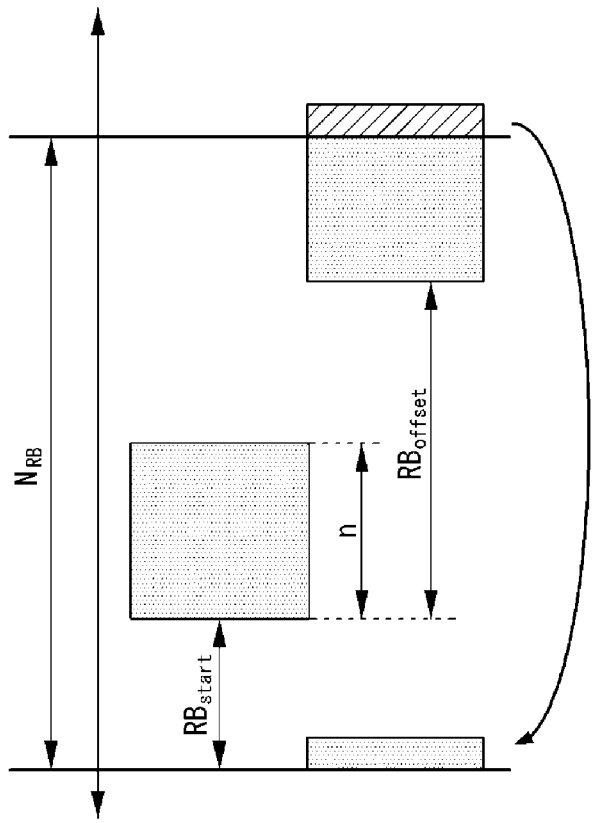
FIG. 9 illustrates another example of an uplink transmission method for a frequency hopping with semi-static offset described in the present disclosure.

As illustrated in FIG. 9, the UE may move the resource(s) exceeding the BWP range by $N_{RB}$ instead of the resource exceeding the BWP range (e.g., $[r_1-N_{RB}, r_2-N_{RB}, \ldots, r_n-N_{RB}]$) and may perform uplink transmission in the moved resource(s).

In this case, the UE uses non-consecutive uplink resources.

In this instance, when the UE uses transform precoding (e.g., DFT-s-OFDM), a performance for the uplink transmission may be relatively reduced.

Thus, in this case, the UE may be defined or configured to transmit to other waveform (e.g., CP-OFDM) with automatically better performance without other signalling of the base station.

Alternatively, whether or not to apply such an operation (UL transmission depending on whether or not to move resources exceeding the BWP range) may be determined depending on the waveform that the UE currently uses.

FIG. 9 illustrates another example of an uplink transmission method for a frequency hopping with semi-static offset described in the present disclosure.

(Method 3-3)

Method 3-3 may be a method, in which when a frequency hopped resource exceeds a BWP range, the UE performs rate-matching or puncturing for the resource exceeding the BWP range.

The rate-matching or puncturing may be expressed as drop.

(Method 3-3-1)

When a frequency hopped resource exceeds a BWP range and the UE performs rate-matching or puncturing for the resource exceeding the BWP range, a transport block size (TBS) may be adjusted in order to maintain a configured coding rate while using less resources.

In this instance, the adjustment for the TBS may be to use only a predetermined rate in a determined original TBS, or subtract any offset, or consider the rate-matching or the puncturing in a determining step of the TBS.

For example, the TBS may be determined by considering a rate of resources exceeding the BWP range in a limiting process of TBS determination in some resource elements (REs) as in a RE and a demodulation reference signal (DMRS) overhead, or assuming (n−K/2) resource blocks when the number of resource blocks exceeding the BWP is K.

In this instance, the operations of the methods 3-1 to 3-3 may be applied only when a size of the resource exceeding the BWP range exceeds any threshold.

In this instance, a unit of the threshold may be bits, resource blocks, or resource elements.

The threshold may be a predetermined value or a value determined by higher layer signaling or L1 signaling of the base station.

Alternatively, whether or not to apply such an operation may be determined depending on the waveform that the UE currently uses.

Frequency Hopping for Msg3

Next, a frequency hopping method of Msg3 (UL transmission that the UE transmits for RAR) of a RACH process is described.

Shortly, the RACH process may be roughly summarized as (1) a first step in which the UE transmits PRACH preamble (or Msg1) to the base station, (2) a second step in which the UE receives a response RAR (or Msg2) to the PRACH preamble from the base station, (3) a third step in which the UE transmits UL transmission (or Msg3) to the base station, (4) a fourth step in which the UE receives a response (or Msg4) to the UL transmission.

When a random access is performed, the frequency hopping may be performed to obtain the frequency diversity even if a response (the second step above) to a random access response (RAR) of the base station and the Msg3 transmission (the third step above) of the base station are performed.

If the UE is in a process (initial (random) access (IA)) of first accessing to the network, the UE may perform the frequency hopping using a random or predetermined frequency hopping offset set since the UE is in a state of not obtaining information about the frequency hopping offset set from the base station.

However, if the UE has been already in a RRC connection state, for example, if the UE performs a random access process instead of scheduling request (SR) transmission in order to obtain resources required for uplink transmission, because the UE has been already allocated a frequency hopping offset from the base station, the UE may utilize the frequency hopping offset in the random access.

Thus, if the UE performs a random access to which the frequency hopping is applied, other frequency hopping may be performed according to the purpose of the random access or the UE's connection state upon the random access. In this case, the following methods may be considered.

(Method 4-1)

The Msg3 may always use a predetermined frequency hopping offset or frequency hopping offset set, regardless of a RRC state of the UE and radio network temporary identifier (RNTI) value sent from a RAR message.

(Method 4-2)

If the RRC state of the UE is RRC_CONNECTED, and the RNTI value sent from the RAR message is the same as C-RNTI value that the UE obtains in advance, i.e., if the base station knows that the corresponding UE is already in the RRC_CONNECTED through the random access of the UE, the UE may transmit the Msg3 applying the frequency hopping to the base station using the frequency hopping offset set that is previously allocated via RRC signaling.

(Method 4-3)

RACH configuration associated with a random access resource in which the UE performs the random access may include a frequency hopping offset value or a frequency hopping offset set as a parameter.

If the UE performs the random access through the random access resource associated with the RACH configuration, the UE may use the frequency hopping offset or the frequency hopping offset set included in the RACH configuration for frequency hopping.

If the corresponding parameter is not included in the RACH configuration, the UE does not perform the frequency hopping or may use a predetermined frequency hopping offset or frequency hopping offset set.

Figure 10:
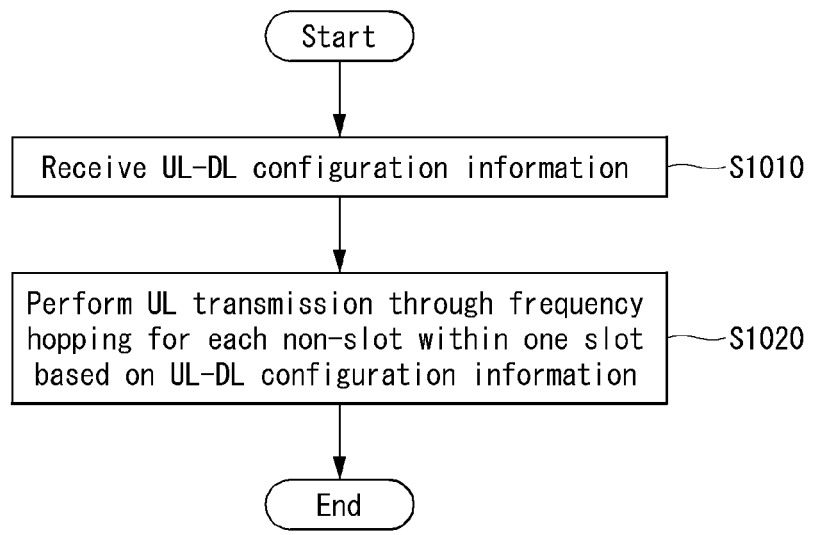
FIG. 10 is a flow chart illustrating an operation of a UE for performing a method described in the present disclosure.

FIG. 10 is a flow chart illustrating an operation of a UE for performing a method described in the present disclosure.

That is, FIG. 10 illustrates a method for the UE to perform uplink transmission through frequency hopping in a wireless communication system.

First, the UE receives uplink (UL)-downlink (DL) configuration information from a base station in S1010.

Next, the UE performs uplink transmission through a frequency hopping for each non-slot on non-slots that are repeated at least two times within one slot based on the UL-DL configuration information in S1020.

The non-slot may be a scheduling unit with a smaller time interval than the one slot.

If a specific non-slot among the non-slots that are repeated at least two times based on the UL-DL configuration information is not available, the UE may apply a frequency hopping related to the specific non-slot to a next repeated non-slot.

A detailed description related to this is made with reference to FIG. 7(*b*).

A scheduling unit of the non-slot may be configured based on at least one of the number of symbols or a subcarrier spacing included in the scheduling unit.

The non-slot may be used for ultra reliable and low latency communication (URLLC), unlicensed band or millimeter wave.

If a resource for uplink transmission is not included in a bandwidth part (BWP) by the frequency hopping related to the non-slot, the resource that is not included in the BWP is moved by a predetermined resource block (RB) offset or is not used for the uplink transmission. A more detailed description related to this will be made with reference to FIGS. 8 and 9.

The movement by the predetermined RB offset for the resource that is not included in the BWP may be determined according to a type of waveform configured for the uplink transmission.

The waveform may be cyclic prefix (CP)-orthogonal frequency division multiplexing (OFDM) or discrete Fourier transform spread OFDM (DFT-s-OFDM).

If the waveform is the CP-OFDM, the resource that is not included in the BWP may be moved by the predetermined RB offset.

Figure 11:
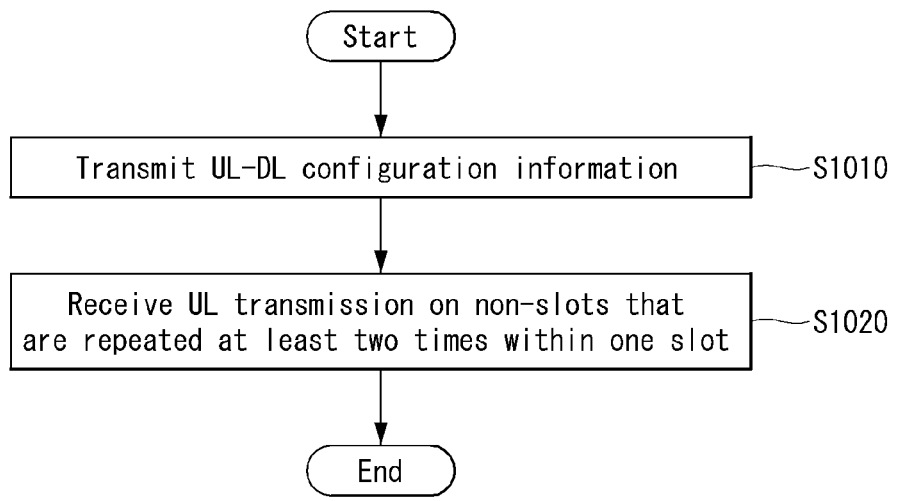
FIG. 11 is a flow chart illustrating an operation of a base station for performing a method described in the present disclosure.

FIG. 11 is a flow chart illustrating an operation of a base station for performing a method described in the present disclosure.

First, a base station transmits uplink (UL)-downlink (DL) configuration information to a UE in S1110.

Next, the base station receives uplink transmission from the UE on non-slots that are repeated at least two times within one slot in S1120.

The uplink transmission may be performed through a frequency hopping for each non-slot.

The non-slot may be a scheduling unit with a smaller time interval than the one slot.

If a specific non-slot among the non-slots that are repeated at least two times is not available, a frequency hopping related to the specific non-slot may be applied to a next repeated non-slot.

A detailed description related to this is made with reference to FIG. 7(*b*).

A scheduling unit of the non-slot may be configured based on at least one of the number of symbols or a subcarrier spacing included in the scheduling unit.

The non-slot may be used for ultra reliable and low latency communication (URLLC), unlicensed band or millimeter wave.

Overview of Device to which the Present Disclosure is Applicable

Figure 12:
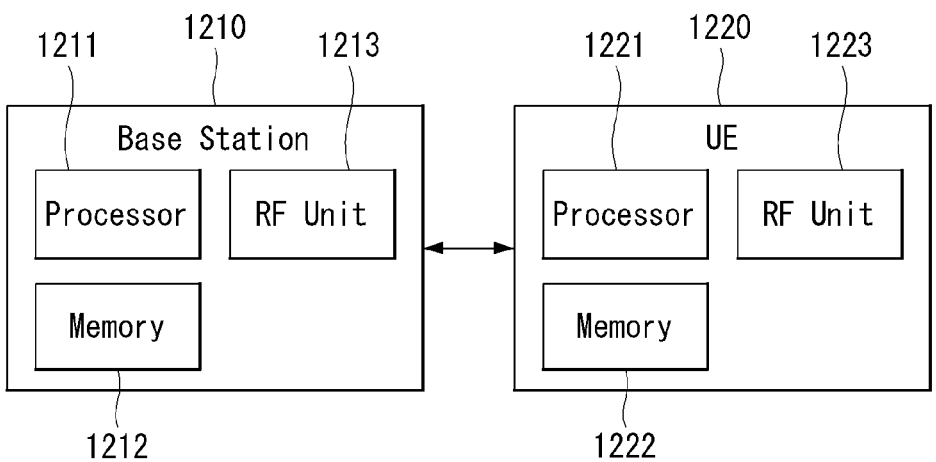
FIG. 12 illustrates a block configuration diagram of a wireless communication device to which methods described in the present disclosure are applicable.

FIG. 12 illustrates a block configuration diagram of a wireless communication device to which methods described in the present disclosure are applicable.

Referring to FIG. 12, a wireless communication system includes a base station 1210 and multiple UEs 1220 located in an area of the base station.

Each of the base station 1210 and the UE 1220 may be represented as a wireless device.

The base station 1210 includes a processor 1211, a memory 1212, and a radio frequency (RF) module 1213. The RF module 1213 may include a transmitter and a receiver. The processor 1211 implements functions, processes, and/or methods described in FIGS. 1 to 11. Layers of radio interface protocol may be implemented by the processor 1211. The memory 1212 is connected to the processor 1211 and stores various types of information for driving the processor 1211. The RF module 1213 is connected to the processor 1211 and transmits and/or receives radio signals.

The UE 1220 includes a processor 1221, a memory 1222, and a RF module 1223.

The processor 1221 implements functions, processes, and/or methods described in FIGS. 1 to 11. Layers of radio interface protocol may be implemented by the processor 1221. The memory 1222 is connected to the processor 1221 and stores various types of information for driving the processor 1221. The RF module 1223 is connected to the processor 1221 and transmits and/or receives radio signals.

The memories 1212 and 1222 may be inside or outside the processors 1211 and 1221 and may be connected to the processors 1211 and 1221 through various well-known means.

Further, the base station 1210 and/or the UE 1220 may have a single antenna or multiple antennas.

Antennas 1214 and 1224 function to transmit and receive the radio signal.

Figure 13:
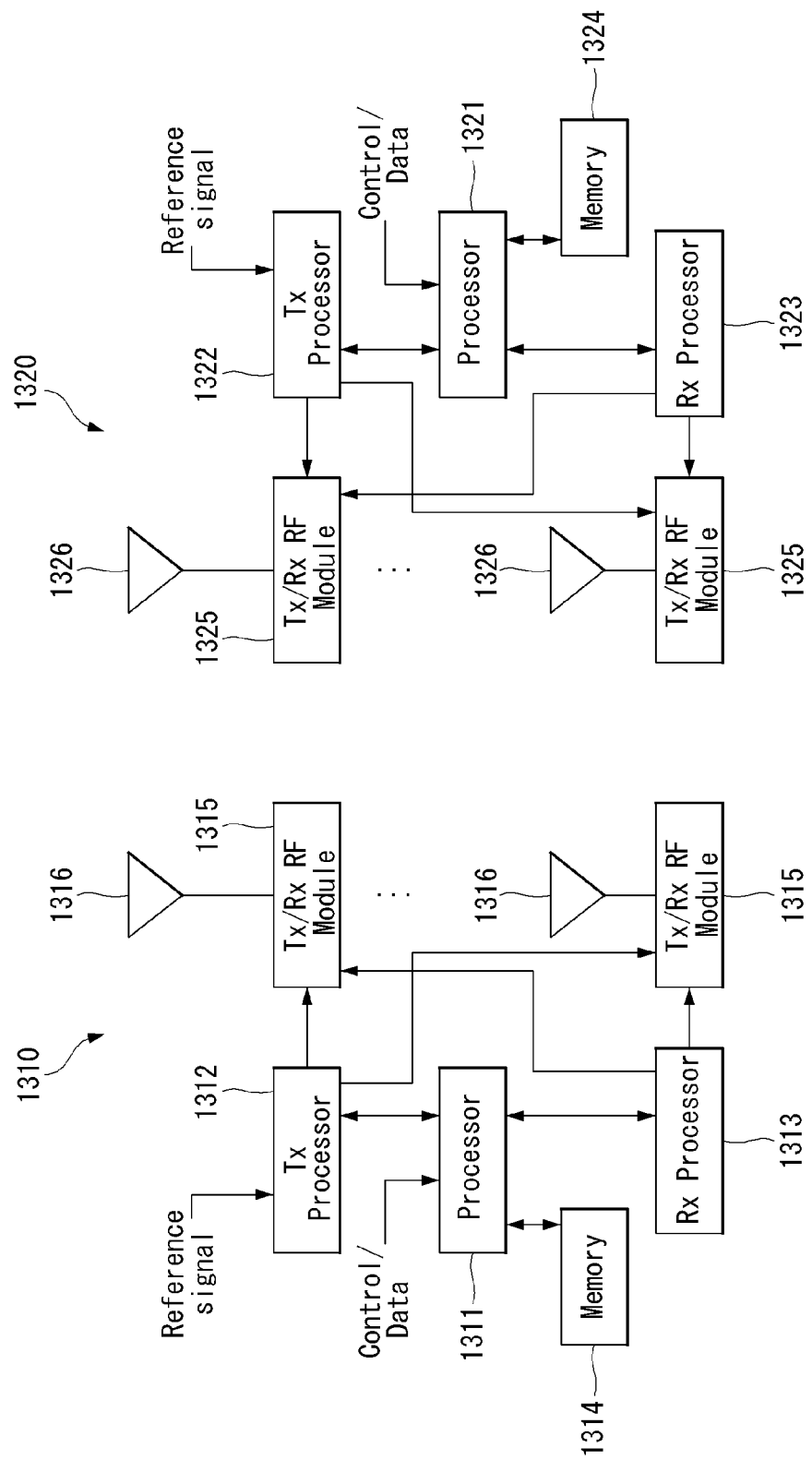
FIG. 13 illustrates another example of a block configuration diagram of a wireless communication device to which methods described in the present disclosure are applicable.

FIG. 13 illustrates another example of a block configuration diagram of a wireless communication device to which methods described in the present disclosure are applicable.

Referring to FIG. 13, a wireless communication system includes a base station 1310 and multiple UEs 1320 located in an area of the base station. The base station 1310 may be represented by a transmitter, and the UE 1320 may be represented by a receiver, or vice versa. The base station 1310 and the UE 1320 respectively include processors 1311 and 1321, memories 1314 and 1324, one or more Tx/Rx RF modules 1315 and 1325, Tx processors 1312 and 1322, Rx processors 1313 and 1323, and antennas 1316 and 1326. The processors implement functions, processes, and/or methods mentioned above. More specifically, in DL (communication from the base station to the UE), an upper layer packet from a core network is provided to the processor 1311. The processor implements functionality of the L2 layer. In the DL, the processor provides multiplexing between a logical channel and a transport channel and radio resource allocation to the UE 1320 and is also responsible for signaling to the UE 1320. The transmit (Tx) processor 1312 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1316 via a separate Tx/Rx module (or transceiver 1315). Each Tx/Rx module may modulate an RF carrier with a respective spatial stream for transmission. At the UE, each Tx/Rx module (or transceiver 1325) receives a signal through the respective antenna 1326 of each Tx/Rx module. Each Tx/Rx module recovers information modulated onto an RF carrier and provides the information to the receive (Rx) processor 1323. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that were originally transmitted by the base station on the physical channel. The corresponding data and control signals are provided to the processor 1321.

UL (communication from the UE to the base station) is processed at the base station 1310 in a manner similar to the description associated with a receiver function at the UE 1320. Each Tx/Rx module 1325 receives a signal through the respective antenna 1326. Each Tx/Rx module provides an RF carrier and information to the Rx processor 1323. The processor 1321 may be associated with the memory 1324 that stores a program code and data. The memory may be referred to as a computer readable medium.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

Although a method of performing uplink transmission in a wireless communication system according to the present disclosure has been described focusing on examples applying to the 3GPP LTE/LTE-A system and the 5G system (new RAT system), it can be applied to various wireless communication systems other than them.

The invention claimed is:

1. A method of transmitting, by a user equipment (UE), a physical uplink shared channel (PUSCH) through a frequency hopping in a wireless communication system, the method comprising:
   receiving uplink (UL)-downlink (DL) configuration information from a base station; and
   repeatedly transmitting, to the base station, the PUSCH through the frequency hopping for each non-slot on non-slots based on the UL-DL configuration information,
   wherein the frequency hopping is performed based on whether non-slot is even-numbered non-slot or odd-numbered non-slot without considering one or more invalid resources.

2. The method of claim 1, wherein the non-slot is a scheduling unit with a time duration that is smaller than one slot.

3. The method of claim 1, wherein a scheduling unit of the non-slot is configured based on at least one of a subcarrier spacing or a number of symbols included in the scheduling unit.

4. The method of claim 1, wherein the non-slot is used for ultra reliable and low latency communication (URLLC), an unlicensed band or a millimeter wave.

5. The method of claim 1, wherein based on a resource for the PUSCH being not included in a bandwidth part (BWP) by the frequency hopping, the resource that is not included in the BWP is offset by a predetermined resource block (RB) offset or is not used for the PUSCH.

6. The method of claim 5, wherein the offset by the predetermined RB offset for the resource that is not included in the BWP is determined depending on a type of waveform configured for the PUSCH.

7. The method of claim 6, wherein the waveform is cyclic prefix (CP)-orthogonal frequency division multiplexing (OFDM) or discrete Fourier transform spread OFDM (DFT-s-OFDM).

8. The method of claim 7, wherein based on the waveform being the CP-OFDM, the resource that is not included in the BWP is offset by the predetermined RB offset.

9. A user equipment (UE) configured to perform a physical uplink shared channel (PUSCH) transmission through a frequency hopping in a wireless communication system, the UE comprising:
- at least one transceiver;
- at least one processor; and
- at least one computer-readable memory operably connectable to the at least one processor and storing instructions that, based on being executed by the least one processor, perform operations comprising:
  - receiving uplink (UL)-downlink (DL) configuration information from a base station; and
  - repeatedly transmitting, to the base station, the PUSCH through the frequency hopping for each non-slot on non-slots based on the UL-DL configuration information,
  - wherein the frequency hopping is performed based on whether non-slot is even-numbered non-slot or odd-numbered non-slot without considering one or more invalid resources.

10. The UE of claim 9, wherein the non-slot is a scheduling unit with a time duration that is smaller than one slot.

11. The UE of claim 9, wherein a scheduling unit of the non-slot is configured based on at least one of a subcarrier spacing or a number of symbols included in the scheduling unit.

12. The UE of claim 9, wherein the non-slot is used for ultra reliable and low latency communication (URLLC), an unlicensed band or a millimeter wave.

13. The UE of claim 9, wherein based on a resource for the PUSCH being not included in a bandwidth part (BWP) by the frequency hopping, the resource that is not included in the BWP is offset by a predetermined resource block (RB) offset or is not used for the PUSCH.

14. The UE of claim 13, wherein the offset by the predetermined RB offset for the resource that is not included in the BWP is determined depending on a type of waveform configured for the PUSCH.

15. The UE of claim 14, wherein based on the waveform being the CP-OFDM, the resource that is not included in the BWP is offset by the predetermined RB offset.

16. The method of claim 1, wherein the one or more invalid resources are one or more symbols.

17. The UE of claim 9, wherein the one or more invalid resources are one or more symbols.

* * * * *